Patented Mar. 23, 1954

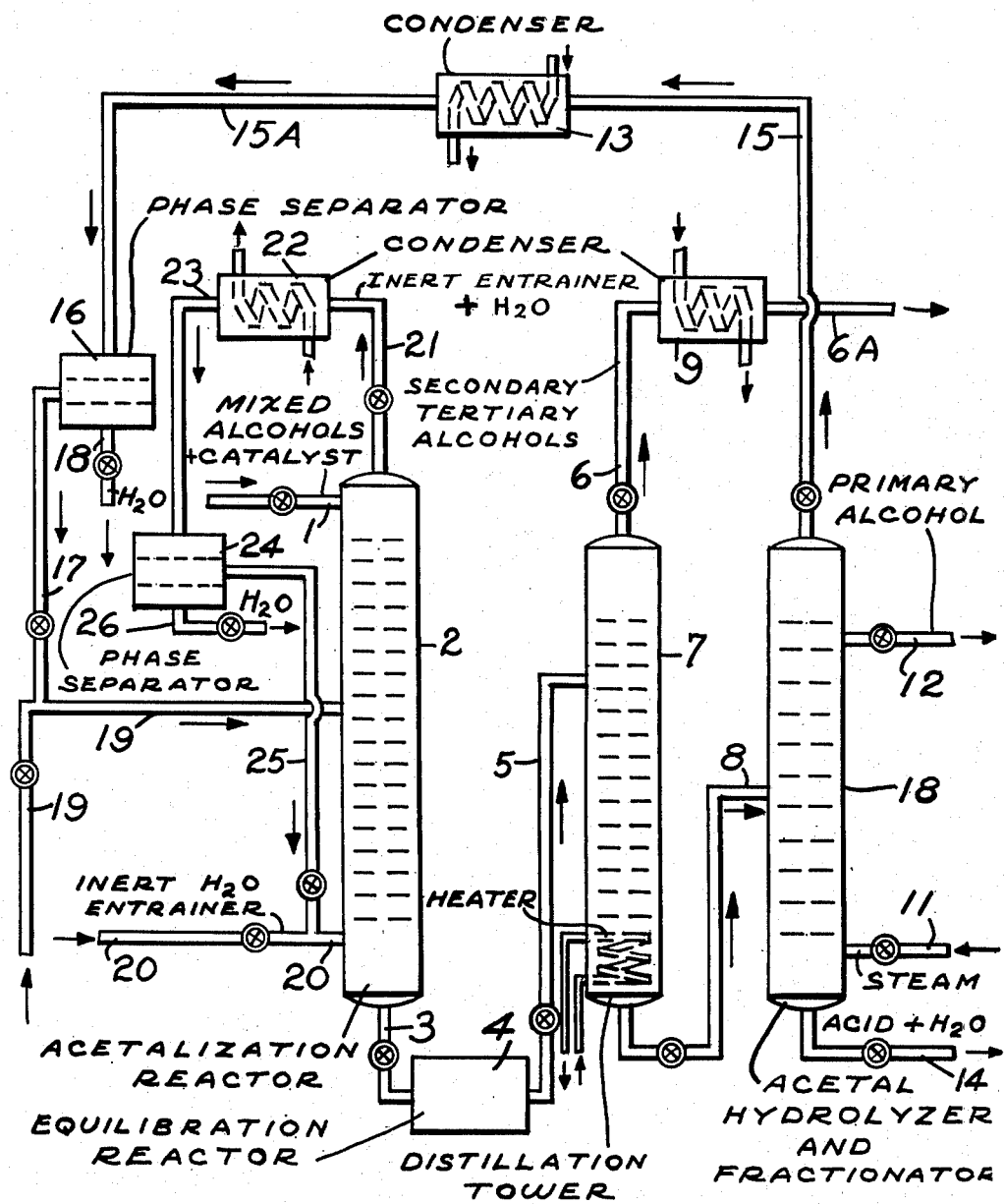

2,673,222

UNITED STATES PATENT OFFICE 2,673,222

SEPARATION OF ISOMERIC ALCOHOLS BY SELECTIVE ACETALIZATION

James H. McAteer and Herbert K. Wiese, Cranford, N. J., assignors to Standard Oil Development Company, a corporation of Delaware Application December 31, 1949, Serial No. 136,296

8 Claims. (Cl. 260—643)

This invention relates to a novel method for the separation of alcohol components of a mixture of monohydric alcohols by means of selective acetalization followed by suitable steps for recovering the components.

It has been discovered that close-boiling alcohol mixtures are separable by a process wherein a part of the alcohols is selectively acetalized, that is, the primary alcohols are converted to acetals and the secondary and tertiary alcohols are separated from the resulting acetals by distillation. The primary alcohols are then recovered in pure form by hydrolysis of the acetals followed by isolation of the alcohol. Thus, this process can be operated to separate mixtures of alcohols containing at least two monohydric alcohols having different types of hydroxyl groups, the types of hydroxyl groups being classified as primary, secondary, and tertiary.

There are a great many examples of mixtures of alcohols which are normally quite difficult to separate. For instance, it is well known that the hydrogenation of carbon monoxide produces, depending upon synthesis conditions, varying amounts of oxygenated compounds including a wide variety of aliphatic alcohols. Other sources of close-boiling alcohol mixtures include mixtures obtained in fermentation processes, hydrocarbon oxidation products, mixtures prepared in the hydrolysis of mixed alkyl halides, and alcohol products from the reduction of mixed aldehydes and ketones. Generally, such alcohol mixtures consist of primary, secondary, and, to a minor extent, tertiary types. The boiling points of several constituents of such an alcohol mixture are frequently so similar as to make difficult or impossible their separation by distillation. Thus, for example, n-propanol and sec-butanol have normal boiling points of 97.2 and 99.5° C., respectively, and their aqueous azeotropes distill within an even smaller range of temperature.

Separation of such mixtures has been effected by the use of extractive distillation processes employing water as a solvent. However, such separation of alcohol mixtures containing major amounts of alcohols having four or more carbon atoms to the molecule, becomes increasingly difficult due to low solubility of such alcohols in water. The present process is well adapted for use in separating just this type of mixture largely made up of alcohols having more than four carbon atoms and substantially immiscible with water. In the broadest sense, the process may be used to separate mixtures of alcohols having from two to about twelve carbon atoms.

It has long been known that hydroxylated compounds, particularly those of the simple alcohol class, can be reacted with aldehydes to yield acetals. For example, the following is a representative equation for the reaction involving a primary alcohol and an aldehyde to produce an acetal and water:

$$R-CHO+2R'-CH_2OH \rightleftharpoons R-CH(OCH_2R')_2+H_2O$$

wherein R and R' are hydrogen, alkyl, aryl, aralkyl, alkaryl, cycloalkyl, or heterocyclic radicals.

As is indicated in the above equation, the reaction to form the acetal is an equilibrium reaction. The rate of reaction of any particular aldehyde with various alcohols is quantitatively related to the type of alcohol which is involved; thus the rate of reaction of a tertiary alcohol is faster than that of a secondary alcohol, which in turn is faster than that of a primary alcohol.

The equilibrium or conversion to acetal is in reverse order. Thus, for a given ratio of aldehyde to alcohol, a primary alcohol is converted to acetal to a greater extent than is a secondary, which in turn gives a greater conversion than a tertiary alcohol. Normally, such processes are carried out in the presence of a suitable catalyst. This information can be utilized together with certain specific and critical features to effect a very good separation of alcohols according to type from a mixture of primary, secondary and tertiary alcohols.

The process of the present invention comprises the following operations:

1. Acetalization of a portion of the mixed alcohol feed under such conditions that water of reaction is removed from the reaction zone, thereby eliminating the restrictions on aldehyde conversion due to equilibrium.

2. Equilibration of the substantially aldehyde-free reaction mixture obtained in (1) to achieve selective acetalization. Thus, for example: secondary alcohol acetal+primary alcohol⇌primary alcohol acetal+secondary alcohol.

3. Separation of unreacted alcohols from acetal by distillation.

4. Decomposition of acetal to recover alcohol and regenerate the aldehyde.

The term "mixed alcohols" employed above will be understood to relate to mixtures containing primary, secondary, and tertiary monohydric alcohols. When the mixed alcohol feed contains only primary and secondary alcohols, the acetalization and equilibration steps, followed by distillation, effect the isolation of a secondary alcohol constituent of the feed. Separation of secondary and tertiary alcohols, when the latter are present, may be effected by the selective acetalization of the secondary alcohol subsequent to the removal of primary alcohol feed constituents, or if preferred, the secondary and tertiary alcohols may be separated by any other available means. It is also within the scope of this invention to separate mixtures consisting predominantly of secondary and tertiary alcohols and mixtures consisting predominantly of primary and tertiary alcohols.

The process is particularly suited to the separation of mixed alcohol feeds in which the alcohols to be selectively acetalized are present in major proportions. Best results are normally obtained when the mixed alcohol feed contains only minor proportions of water.

The aldehyde used for the selective acetalization reaction may be chosen from those having a wide range of molecular weight and may be either a single pure substance or a mixture of two or more aldehydes. It is also to be understood that it is possible to start with an acetal consisting of the desired aldehyde and an alcohol whose boiling point is below the boiling point of the mixed alcohol feed.

Any known type of acetalization catalyst may be used in this process to increase the reaction rate between the hydroxyl compound and the aldehyde compound. Characteristically, reactions of the acetalization type are most effectively catalyzed by an acidic catalyst such as hydrochloric acid, sulfuric acid, phosphoric acid, benzene sulfonic acid, calcium chloride, zinc chloride, ammonium chloride, and numerous other catalysts of similar type. In general, it is preferred to use a catalyst at least partly soluble in the reactants. Although both volatile and non-volatile catalysts may be employed, it is frequently advantageous to use one of the latter type. This is of particular advantage in continuous-type operations, since catalyst losses and recovery problems are minimized.

The process is advantageously carried out in a tower or column wherein the aldehyde and a mixed alcohol feed are contacted in the presence of a catalyst. It may be conducted as a continuous, semi-continuous, or batch-type operation; the continuous type of operation is generally preferred. Improved efficiency of separation of the mixed alcohol feed may be obtained, if desired, by recycling a portion or all of either the unreacted alcohols and/or the alcohols recovered by hydrolysis of the acetals. In order to effect ultimate, complete separation of the pure alcohol components, it would require a multiplicity of these steps of acetalization, equilibration, separation of unreacted components, hydrolysis, and recovery of the hydrolyzed products.

The rate of the acetalization reaction with a given catalyst and alcohol-aldehyde mixture increases with increasing temperature. The preferred operating temperatures for the acetalization zone lie between 50 and 200° C., dependent upon the particular reactants employed, the catalyst and the equipment used. The operating temperatures for the equilibration zone lie preferably between 50 and 200° C. In any given operation, the temperature of the equilibration zone may be the same or different from that in the acetalization zone.

The amount of aldehyde to the acetalization zone is determined by the nature of the mixed alcohol feed. More specifically, the aldehyde/alcohol feed ratio is adjusted so that substantially only that portion of the alcohol feed which is to be selectively acetalized is converted to acetal. With a given alcohol feed, the choice of aldehyde and catalyst will govern somewhat the exact mode of operation in the acetalization zone. Thus, the addition of aldehyde is carried out in a manner to permit adequate contacting of the aldehyde-alcohol components under conditions, e. g., residence time, such that substantially complete conversion of the aldehyde occurs.

The catalyst is added at a point such that it is present throughout the reaction zone.

The removal of water from the acetalization zone may be effected by stripping with an inert diluent, a portion of the alcohol feed, or aldehyde. The choice of entrainer in a given instance will be determined in part by the relative volatilities of the reactants and in part by the composition of the mixed alcohol feed.

The effluent from the acetalization zone enters the equilibration zone. In this zone, sufficient residence time is provided to effect the equilibration of the alcohol-acetal mixture, as indicated previously, in the presence of a suitable acetalization catalyst. The catalyst may be the same or different from that employed in the acetalization zone.

Separation of the unreacted alcohols from the acetals in the equilibrated alcohol-acetal mixture is effected by distillation wherein the unreacted alcohols are recovered overhead. It is preferred that the catalyst employed in previous steps of the process be removed by neutralization or other suitable means prior to distillation.

The recovery of the acetalized alcohols from their acetals following distillation may be carried out in any suitable manner such as by hydrolysis in the presence of an acid catalyst and steam. The liberated alcohol and aldehyde are separated by distillation and the latter recycled, if desired, to the acetalization zone.

In order to achieve a high degree of cleanup, as well as purity of the alcohol separated as acetal by one passage of the alcohol mixture through the process, the following critical features must be met:

1. The ratio of aldehyde to mixed alcohol feed must be regulated so that substantially only that portion of the alcohol feed which is to be selectively acetalized is converted.

2. Means must be provided for the continuous removal from the reaction zone of water of reaction, as well as extraneous water introduced with the feed.

3. An equilibration zone must be provided to permit the substantially aldehyde-free mixture of acetals and alcohols leaving the acetalization zone to reach chemical equilibrium.

Figure 1 shows a modification of the invention which can be employed in the separation of a mixed alcohol feed in which a non-volatile acetalization catalyst is used and an extraneous, inert water entrainer is used.

Referring now to Figure 1, for the acetalization reactor there is employed a distillation type tower 2 wherein the selective acetalization reaction is carried out. Within tower 2, the aldehyde and mixture of primary, secondary, and tertiary alcohols to be separated are contacted in the presence of the acidic acetalization catalyst. There is added to the tower by inlet line 19 the acetalizing aldehyde in an amount insufficient to react with all of the alcohols of the mixture. The water which is formed by the selective reaction of the aldehyde with the primary alcohol is removed from the acetalization reactor as an azeotrope with an inert water entrainer introduced into tower 2 by inlet line 20. The entrainer-water azeotrope is distilled overhead from tower 2 through line 21. This vapor stream is passed to condenser 22 and thence from condenser 22 through line 23 to phase separator 24 from which the upper entrainer layer is recycled to acetalization reactor 2 through lines 25 and 20, and the lower water layer is discarded through line 26. From the lower part of tower 2 by line 3, the mixture of acetals and unreacted alcohols is passed first to an equilibration reactor 4 wherein acetals and unreacted alcohols attain substantial chemical equilibrium, thereby producing selective acetalization of the primary alcohols. Thereafter the equilibrated reaction mixture is passed by line 5 to distillation tower 7 from which the unreacted secondary and tertiary alcohols are removed as a vapor stream by line 6, condensed in condenser tertiary alcohols relatively free from primary alcohols. From the lower portion of tower 7 there is removed by line 8 the acetals of the primary alcohols which are passed into an acetal hydrolyzer and fractionator tower 18. Steam is injected by line 11 in order to effect substantially complete hydrolysis of the acetals of the primary alcohols. The acid catalyst-water mixture is removed from the lower portion of tower 18 by line 14, while overhead the aldehyde is separated by fractionation as a vapor stream and is passed by line 15 into condenser 13 from which a liquefied aldehyde-water product is passed by line 15A into phase separator 16. From phase separator 16 there is removed as an upper layer a relatively pure liquid aldehyde which is returned to acetalization reactor 2 by means of lines 17 and 19. The lower water layer from the phase separator 16 is discarded through line 18. The primary alcohol is recovered from tower 18 by means of a side stream outlet 12 which is positioned at an intermediate point between inlet feed line 8 and the overhead exit line 15 through which the aldehyde is removed. This primary alcohol is of relatively pure quality and, if desired, a part or all may be recycled in order to enrich it further.

Following removal of the reaction mixture from the equilibration reactor 4, it may be desired to remove the acidic acetalization catalyst which is necessary in reactor 2. Such removal can be carried out by contacting the reaction mixture with caustic and subsequent washing. However, if the acidic catalyst is removed at that point, it will be necessary to add an acidic catalyst to the acetal hydrolyzer and fractionator tower 18 since the presence of some type of catalyst is highly desirable in tower 18.

Where the separation process is being carried out to separate alcohols having more than six carbon atoms, it may be desirable to carry the acetal hydrolysis in a zone separate from that in which the primary alcohol and aldehyde products are separated by fractionation.

EXAMPLE I

To demonstrate the feasibility of this process, the following batch experiment was carried out. An alcohol mixture consisting of n-amyl alcohol and hexanol-2 was acetalized with a limited amount of n-butyraldehyde at about 85.0° C. Benzene was added to act as entrainer for the water of reaction. The reaction was catalyzed by passing a slow stream of anhydrous hydrogen chloride into the reaction mixture. After the unreacted alcohol was distilled from the reaction mixture, the remaining acetals were hydrolyzed with about 10.0% aqueous sulfuric acid. The n-butyraldehyde thus liberated was separated by fractionation from the resulting alcohols produced by hydrolysis. The results are summarized in the table below.

Table

SEPARATION OF ISOMERIC ALCOHOLS BY SELECTIVE ACETALIZATION

| Component | Feed, gms. | Recovered, gms. | |
|---|---|---|---|
| | | Unreacted Alcohol | Products from Hydrolysis of Acetals |
| hexanol-2 | 38.3 | 30.7 | 7.0 |
| n-amyl alcohol | 33.0 | 14.6 | 14.4 |
| n-butyraldehyde | 16.0 | | 14.0 |

COMPOSITION OF ALCOHOL MIXTURE, WT. PERCENT

| Component | Feed | Unreacted Alcohol | Alcohols from Hydrolysis of Acetals |
|---|---|---|---|
| hexanol-2 | 53.8 | 67.7 | 32.8 |
| n-amyl alcohol | 46.2 | 32.3 | 67.2 |

It is evident from the table by noting the enrichment of n-amyl alcohol obtained in the alcohol mixture from the hydrolysis of the acetals that primary alcohols can be made to undergo selective acetalization in the presence of secondary alcohols.

In another experiment a mixture of these two alcohols was separated using heptaldehyde as the acetalization aldehyde and phosphoric acid as the catalyst. In this case, a portion of the mixed alcohol feed served as the water entrainer. A selective acetalization was likewise obtained.

EXAMPLE II

The process was further demonstrated in a batch experiment in which an alcohol mixture containing 48.2 parts by weight of secondary butanol (0.65 mole), 87.3 parts of isoamyl alcohol (0.99 mole) was subjected to acetalization with an insufficient amount of n-butyraldehyde at a reaction temperature of approximately 74° C. In this case the aldehyde was used as water entrainer to remove water of reaction from the reaction zone.

Phosphoric acid was employed as the catalyst. When the selective acetalization reaction was complete, the reaction products were cooled and the catalyst neutralized with caustic. Fractionation of the neutral products was carried out and there was recovered 14.2 parts by weight (0.20 mole) of n-butyraldehyde, 45.8 parts by weight (0.62 mole) of secondary butanol, and 57.5 parts by weight (0.65 mole) of isoamyl alcohol. The fractionation was continued under reduced pressure and there was obtained 37.6 parts by weight of (0.15 mole) of isoamyl butyral which contained the equivalent of 0.30 mole of isoamyl alcohol. Thus, it can be seen from this trial experiment that a substantial enrichment of both the primary alcohol and the secondary alcohol fraction takes place under the indicated selective acetalization conditions.

EXAMPLE III

This example is submitted to indicate this process as operated in a continuous manner. In this example, the boiling point of the acetalizing aldehyde is below that of any of the components of the alcohol mixture being separated, the $H_2O$ entrainer is an inert, benzene, and the catalyst is of the non-volatile type.

Referring again to Figure 1, into acetalization reactor 2 there is continuously passed by inlet line 1 an alcohol mixture containing n-butyl alcohol (boiling point 117.8° C.) and a secondary amyl alcohol having a boiling range of approximately 116°–119° C. Phosphoric acid of 85% concentration is also passed into tower 2 through inlet 1. Through inlet line 10 there is passed n-butyraldehyde in an insufficient amount to completely acetalize the mixed alcohol feed and, in fact, in an amount approximately required to acetalize only the primary alcohol present in the alcohol feed. The alcohols and aldehyde are contacted within tower 2 in the presence of the acidic acetalization catalyst. Water is formed by the reaction of the aldehyde with the alcohols contained in the feed. There is introduced through line 20 benzene in an amount sufficient to form a benzene-water azeotrope with substantially all of the water being produced by the acetalization reaction in tower 2. The benzene-water azeotrope is distilled overhead through line 21. This vapor stream is passed through condenser 22 and thence from condenser 22 through line 23 to phase separator 24 from which the upper benzene layer is removed by line 25 and recycled back to tower 2 through line 26. The lower water layer is discarded through line 28. From the lower part of tower 2 through line 3 the mixture of acetals and unreacted alcohols resulting from the acetalization is passed to reactor 4 wherein the equilibration reaction between the acetals and unreacted alcohols is allowed to take place. The equilibrated mixture is then passed by line 5 to distillation tower 7 from which a vapor stream enriched in secondary amyl alcohol is removed by line 6, condensed in condenser 9. From the lower portion of tower 7 there is removed by line 8 the acetal of the n-butanol together with a small amount of phosphoric acid catalyst. This liquid mixture is passed into an intermediate portion of an acetal hydrolyzer fractionator tower 10. Steam is injected into tower 10 by line 11 in order to effect substantially complete hydrolysis of the acetal of the n-butanol. The phosphoric acid-water mixture is removed by line 14. Overhead from tower 10 there is removed a vapor stream consisting predominantly of n-butyraldehyde mixture with a little water. This aldehyde-water vapor stream is passed by line 15, through condenser 13, and thence through line 15A to phase separator 16. The upper aldehyde phase is taken by lines 17 and 19 to recycle back to tower 2, while the lower water phase is discarded through line 18. n-Butanol is recovered by a side stream outlet from tower 10, the side stream being positioned between inlet feed line 3 and the overhead outlet line 15. This alcohol stream is substantially enriched in n-butanol and has a substantially reduced content of secondary amyl alcohol.

What is claimed is:

1. A process for the separation of close-boiling mono-hydric alcohols from a mixture thereof in which said alcohols are of at least two different types of the class consisting of primary, secondary, and tertiary alcohols, which comprises reacting in the presence of an acetalization catalyst at 50° to 200° C. a portion of said alcohols with an aldehyde present therein in an amount insufficient to react with the total alcohols in the mixture so that a substantial portion of said alcohols is left unreacted, removing water formed while thus reacting the aldehyde to obtain a resulting mixture of an acetal product with the unreacted alcohol and remaining acetalization catalyst substantially free of water and of unreacted aldehyde, thereafter heating the resulting product mixture at 50° to 200° C. for a period until the primary alcohols left unreacted undergo substantial reaction with the acetals of secondary and tertiary alcohols in the presence of the acetalization catalyst in said product mixture, thereby liberating from the acetals a portion of the secondary and tertiary alcohols which have been originally reacted with the aldehyde, and separating the thus liberated alcohols from the remaining acetals.

2. A process for separating close-boiling primary and secondary mono-hydric alcohols having 2 to 12 carbon atoms per molecule from mixtures thereof, which comprises reacting at 50° to 200° C. in the presence of an acetalization catalyst a portion of the alcohols in said mixture with an aldehyde in an amount insufficient to react with the total alcohols so that a portion of said alcohols is left unreacted, removing water formed while reacting the aldehyde with a portion of the mixed alcohols as the thus reacted alcohols and aldehyde form acetals, subsequently maintaining a resulting mixture of said acetals at 50° to 200° C. with said alcohols left unreacted in the presence of an acetalization catalyst for a period to react free primary alcohol predominantly with acetals of the secondary alcohol present therein to liberate free secondary alcohols from their thus reacted acetals, and separating the free secondary alcohol thus liberated from the remaining acetals of the primary alcohol.

3. A process as described in claim 2, in which said remaining acetals, from which the liberated secondary alcohols are separated, are hydrolyzed to convert these remaining acetals into their aldehyde and alcohol components, and separating said alcohol components as a concentrated primary alcohol product from the aldehyde.

4. A process for separating primary, secondary, and tertiary mono-hydric alcohols from mixtures thereof which comprises reacting alcohols in said mixtures in the presence of a nonvolatile acetalization catalyst at temperatures of 50° C. to 200° C. with an aldehydric reactant until a substantial amount of the alcohols is converted to acetals while a remaining substantial amount of the alcohols remain free, removing water thus formed by reaction of the aldehyde with the alcohols to obtain a product mixture of the acetals with free alcohols and residual catalyst, subsequently maintaining said product mixture substantially free of aldehyde and of water for a period of time at 50° C. to 200° C. to accomplish reaction of free primary alcohols with the acetals of secondary and tertiary alcohols therein, then separating resulting free alcohols by vaporization from the remaining acetals which were reacted with the primary alcohols.

5. The process for separating and concentrating primary alcohols from a mixture of water-immiscible mono-hydric primary, secondary, and tertiary alcohols which are close-boiling and contain 4 to 12 carbon atoms per molecule, which comprises reacting at 50° to 200° C. in the presence of an acetalization catalyst said mixture of alcohols with an aldehyde in an amount insufficient to react with the total amount of alcohols present leaving some uncombined alcohols, simultaneously removing water formed in acetalizing a portion of the alcohols with the aldehyde reactant to obtain a product mixture containing acetals thus formed with uncombined alcohols substantially free of water and of the aldehyde reactant, subsequently maintaining said product mixture in the presence of an acetalization catalyst at 50° C. to 200° C. for a period sufficient to obtain reaction of uncombined primary alcohols with acetals derived from the secondary and tertiary alcohols, whereby the primary alcohols are predominantly converted to acetals while the secondary and tertiary alcohols are thus liberated from their thus reacted acetals, separating the thus obtained mixture of free alcohols from the remaining acetals, and converting the remaining acetals into their aldehyde and alcohol components in which the primary alcohols are more concentrated than in the initial mixture.

6. A process as described in claim 5 in which the predominant primary alcohol is n-amyl alcohol and the predominant secondary alcohol is 2-hexanol, and wherein said remaining acetals on hydrolysis liberate predominantly the n-amyl alcohol.

7. A process as described in claim 5, in which iso-amyl alcohol is the primary alcohol which is predominantly separated from secondary butanol present as a secondary alcohol in the initial mixture.

8. A process as described in claim 5, in which n-butanol alcohol is the primary alcohol predominantly separated from secondary amyl alcohol as the secondary alcohol.

JAMES H. McATEER.
HERBERT K. WIESE.

References Cited in the file of this patent
UNITED STATES PATENTS

| Number | Name | Date |
|---|---|---|
| 2,288,281 | Huijser et al. | June 30, 1942 |
| 2,307,937 | Marvel | Jan. 12, 1943 |
| 2,535,458 | Robeson | Dec. 26, 1950 |

OTHER REFERENCES

Fieser et al.: "Organic Chemistry," pages 221–222, D. C. Heath and Co., Boston (1944). (Copy in Scientific Library.)

Senkus. "Ind. & Eng. Chemistry," vol. 38, No. 9 (September 1946), pages 913–916.